UNITED STATES PATENT OFFICE 2,669,561

COPPER COMPLEX COMPOUNDS OF MONOAZO DYESTUFFS

Albert Schmelzer, Koln-Mulheim, and Otto Bayer, Leverkusen-Bayerwerk, Germany, assignors to Farbenfabriken Bayer Aktiengesellschaft, Leverkusen, Germany, a corporation of Germany No Drawing. Application May 15, 1951,
Serial No. 226,528

Claims priority, application Germany
May 19, 1950

6 Claims. (Cl. 260—149)

The present invention relates to new monoazo dyestuffs and to the method of preparing the same, more particularly it relates to new brown copper-containing monoazo dyestuffs.

These new dyestuffs are the copper complex compounds of monoazo dyestuffs of the general formula:

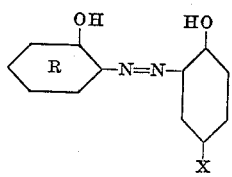

in which formula X stands for an alkyl radical or chlorine, the alkyl radical having from 3 to 8 carbon atoms, and wherein the benzene nucleus R may be further substituted by radicals not causing water-solubility, in particular by chlorine. The alkyl radicals may be straight, branched or cyclic.

According to the present invention these new copper-containing monoazo dyestuffs are obtained by treating monoazo dyestuffs of the general formula:

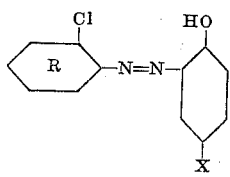

in which formula X and R means the same as stated above in an alkaline-alcoholic solution with copper-yielding agents at elevated temperature. As a rule this reaction is carried out under refluxing conditions. In this reaction the chlorine atom standing in o-position to the azo bridge is exchanged for the hydroxyl group. The reaction with the copper-yielding agents is carried out in known manner in the presence of such compounds as keep the copper-yielding agents dissolved in alkaline medium. Compounds of this kind are—as is known—e. g. polyhydroxy compounds or hydroxy-carboxylic acids.

The new copper-containing monoazo dyestuffs are insoluble in water, but dissolve in all common organic solvents, such as ether, acetone, alcohol, esters, gasoline, benzene, toluene etc. with brown color. In consequence of this surprising solubility in a great variety of solvents, the new dyestuffs can be used for preparing spirit, nitrocellulose, cellulose ester, alkyd resin and transparent lacquers. Being, moreover, soluble in lacquers on the basis of polyisocyanates (cf. "Farben, Lacke, Anstrichstoffe" 2, p. 123 [1948]), they can also be used therein. Furthermore, they can be used in the rubber printing process as well as for dyeing plastics being soluble in benzene, alcohol, esters or ketones, preparations for artificial silk, furniture stainings, waxes, fats, oils and gasoline. The dyeings, colorings and stainings obtained with the new copper-containing dyestuffs are distinguished by a very good fastness to light.

The invention is illustrated by the following examples without being restricted thereto, the parts being by weight.

Example 1

54 parts of the monoazo dyestuff prepared by coupling diazotized 3,4,6-trichloro-1-aminobenzene with 4-tert.-butyl-1-hydroxybenzene, are stirred with 420 parts of alcohol and 30 parts of 40 per cent caustic soda solution, whereby most of the dye-stuff dissolves. A solution of 53 parts of crystalline copper sulfate in 225 parts of water, to which first 75 parts of glycerine and then 225 parts of about 40 per cent caustic soda solution are added, is run into this mixture. Thereafter, further 500 parts of water are added thereto. The reaction mixture is stirred for about 7 hours in the oil bath at an outside temperature of 140–150° C. with reflux. After cooling the copper-containing dyestuff is sucked off, thoroughly washed with water and dried at a temperature of 90–100° C. The dark-colored dyestuff melts at 206–207° C. It is the copper complex compound of the monoazo dyestuff of the formula:

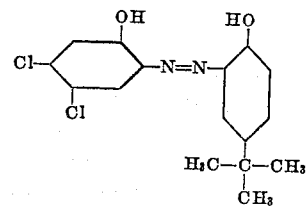

Analysis:
Found: C, 52.2%; H, 4.4%; N, 7.2%; O, 8.2%; Cl, 19.2%; Cu, 7.3%.

The finely ground dyestuff is well soluble in alcohol, benzene, esters etc. with a brown coloration and is distinguished, e. g. as lacquer dyestuff, by a good fastness to light.

Example 2

Starting from 54 parts of the monoazo dyestuff prepared from diazotized 2,4,6-trichloro-1-aminobenzene and 4-tert.-butyl-1-hydroxybenzene, and proceeding according to the directions given in Example 1, there is also obtained a brown, copper-containing dyestuff fast to light, which is the copper complex compound of the monoazo dyestuff of the formula:

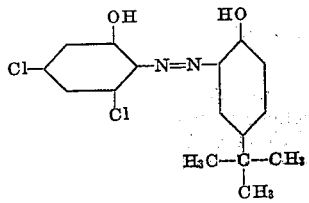

and melts at 213–214° C., and is well suited e. g. as lacquer dyestuff.

Example 3

Under the reaction conditions of Example 1, of 58.6 parts of the monoazo dyestuff prepared by coupling diazotized 3,4,6-trichloro-1-aminobenzene and 4-(methylcyclopentyl)-1-hydroxybenzene, there is also obtained a brown, copper-containing dyestuff with a melting point of 217–220° C., which is the copper complex of the monoazo dyestuff of the formula:

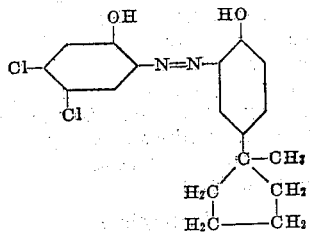

It is fast to light and can be used e. g. for dyeing lacquers.

Example 4

32.3 parts of the monoazo dyestuff prepared from diazotized 2,5-dichloro-1-aminobenzene and 4-tert.-butyl-1-hydroxybenzene are dissolved in 140 parts of alcohol and about 20 parts of 40 per cent caustic soda solution with stirring. Into this mixture a solution of 15 parts of crystalline copper sulfate in 60 parts of water, to which first 16 parts of tartaric acid and then 30 parts of caustic soda solution are added, is run, being followed by an addition of 175 parts of water. With stirring the reaction mixture is refluxed for about 7 hours. After cooling the copper-containing dyestuff thus obtained is sucked off and worked up as usual. The dark-colored dyestuff melts at 170–175° C. and is the copper complex compound of the monoazo dyestuff of the formula:

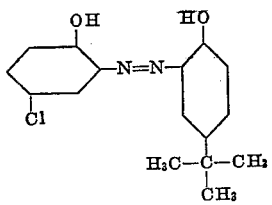

Analysis:
Found: C, 57.4%; H, 5.2%; N, 8.7%; O, 9.1%; Cl, 11.2%; Cu, 7.8%; Na, 1.9%.

The dyestuff shows a good solubility in the common organic solvents. As lacquer dyestuff it yields brown dyeings fast to light.

In the place of tartaric acid also glycerine, lactic acid, citric acid and similar compounds can be used.

Example 5

Starting from 34.3 parts of the monoazo dyestuff prepared from diazotized 2,5-dichloro-1-aminobenzene and 4-isooctyl-1-hydroxybenzene according to the procedure of Example 4, there is also obtained a brown, copper-containing dyestuff, which is the copper complex compound of the monoazo dyestuff of the formula:

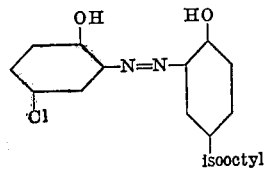

and melts at 153–156° C. It is well suited e. g. as lacquer dyestuff fast to light.

Example 6

30.2 parts of the monoazo dyestuff prepared from diazotized 2,4-dichloro-1-aminobenzene and 4-chloro-1-hydroxybenzene are reacted to the copper-containing dyestuff according to Example 4. The dyestuff thus obtained is a dark-colored powder with a melting point of 96° C. being the copper complex compound of the monoazo dyestuff of the formula:

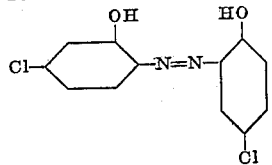

It is well suited as a brown lacquer dyestuff fast to light.

Example 7

17 parts of the monoazo dyestuff prepared from diazotized pentachloro-1-aminobenzene and 4-tert.-butyl-1-hydroxybenzene are suspended with 140 parts of alcohol and about 10 parts of 40 per cent caustic soda solution. Into this mixture, a solution of 7.5 parts of crystalline copper sulfate in 30 parts of water, to which first 5 parts of glycerine and then 15 parts of caustic soda solution are added, is run, being followed by the addition of 60 parts of water. With stirring the mixture is refluxed for about 7 hours. After cooling the difficultly soluble product is sucked off and washed with some alcohol. The alcohol of the filtrate is distilled off, and the separated dyestuff is sucked off and thoroughly washed with water. It is the copper complex compound of the monoazo dyestuff of the formula:

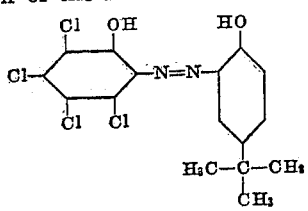

melts at 185–195° C. and has a good solubility in alcohol, benzene, etc. When employed as lacquer dyestuff, it yields red-brown dyeings fast to light.

We claim:

1. As new products the copper complex compounds of monoazo dyestuffs of the general formula:

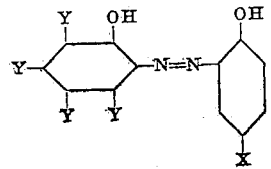

wherein X stands for one of the group consisting of alkyl radicals having from 3 to 8 carbon atoms and chlorine, and Y stands for one of the group consisting of hydrogen and chlorine, at least one of the radicals Y being chlorine, which copper-containing dyestuffs are soluble in common organic solvents with brown coloration.

2. As new products the copper complex compounds of monoazo dyestuffs of the general formula:

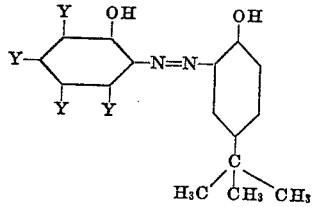

wherein Y stands for one of the group consisting of hydrogen and chlorine, at least one of the radicals Y being chlorine, which copper-containing dyestuffs are soluble in common organic solvents with brown coloration.

3. As new product the copper complex compound of the monoazo dyestuff of the formula:

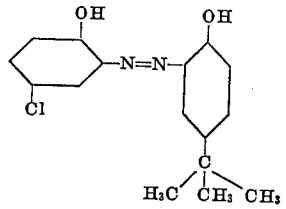

being soluble in common organic solvents with brown coloration yielding dyeings fast to light.

4. As new product the copper complex compound of the monoazo dyestuff of the formula:

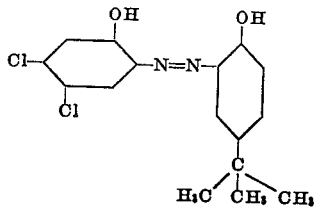

being soluble in common organic solvents with brown coloration yielding dyeings fast to light.

5. As new product the copper complex compound of the monoazo dyestuff of the formula:

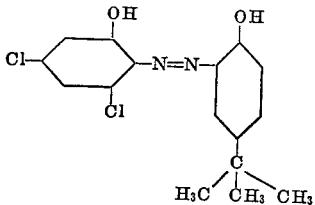

being soluble in common organic solvents with brown coloration yielding dyeings fast to light.

6. As new product the copper complex compound of the monoazo dyestuff of the formula:

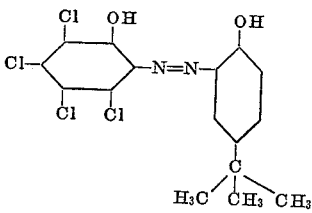

being soluble in common organic solvents with brown coloration yielding dyeings fast to light.

ALBERT SCHMELZER.
OTTO BAYER.

References Cited in the file of this patent

UNITED STATES PATENTS

| Number | Name | Date |
|---|---|---|
| 1,959,844 | Straub et al. | May 22, 1934 |

FOREIGN PATENTS

| Number | Country | Date |
|---|---|---|
| 436,095 | Great Britain | Oct. 4, 1935 |